US007127396B2

(12) United States Patent
Chu et al.

(10) Patent No.: US 7,127,396 B2
(45) Date of Patent: Oct. 24, 2006

(54) METHOD AND APPARATUS FOR SPEECH SYNTHESIS WITHOUT PROSODY MODIFICATION

(75) Inventors: Min Chu, Beijing (CN); Hu Peng, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/030,208

(22) Filed: Jan. 6, 2005

(65) Prior Publication Data

US 2005/0119891 A1 Jun. 2, 2005

Related U.S. Application Data

(62) Division of application No. 09/850,527, filed on May 7, 2001, now Pat. No. 6,978,239.

(60) Provisional application No. 60/251,167, filed on Dec. 4, 2000.

(51) Int. Cl.
*G10L 15/00* (2006.01)

(52) U.S. Cl. ...................................... 704/258; 704/260

(58) Field of Classification Search ................ 704/258, 704/260

See application file for complete search history.

(56) References Cited

U.S. PATENT DOCUMENTS

| | | | | |
|---|---|---|---|---|
| 5,146,405 | A | 9/1992 | Church | 704/9 |
| 5,384,893 | A | 1/1995 | Hutchins | 704/267 |
| 5,732,395 | A | 3/1998 | Silverman | 704/260 |
| 5,839,105 | A | 11/1998 | Ostendorf et al. | 704/256 |
| 5,890,117 | A | 3/1999 | Silverman | 704/260 |
| 5,905,972 | A | 5/1999 | Huang et al. | 704/268 |
| 6,064,960 | A | 5/2000 | Bellegarda et al. | |
| 6,076,060 | A | 6/2000 | Lin et al. | 704/260 |
| 6,185,533 | B1 | 2/2001 | Holm et al. | 704/267 |
| 6,230,131 | B1 | 5/2001 | Kuhn et al. | 704/266 |
| 6,401,060 | B1 | 6/2002 | Critchlow et al. | 704/1 |
| 6,665,641 | B1 | 8/2002 | Coorman et al. | 704/260 |
| 6,499,014 | B1 | 12/2002 | Chihara | 704/260 |
| 6,505,158 | B1 * | 1/2003 | Conkie | 704/260 |
| 6,708,152 | B1 | 3/2004 | Kivimaki | 704/260 |
| 6,751,592 | B1 | 6/2004 | Shiga | 704/258 |
| 6,829,578 | B1 | 12/2004 | Huang et al. | 704/211 |
| 7,010,489 | B1 | 3/2006 | Lewis et al. | 704/260 |
| 2002/0072908 | A1 | 6/2002 | Case et al. | 704/260 |
| 2002/0103648 | A1 | 8/2002 | Case et al. | 704/260 |
| 2002/0152073 | A1 | 10/2002 | DeMoortel et al. | 704/260 |

OTHER PUBLICATIONS

Wang, et al. "Tree-Based Unit Selection for English Speech Synthesis," ICASSP'93, vol. 2, pp. 191-194 (1993).

Huang, X., Luo, Z. and Tang, J., "A Quick Method for Chinese Word Segmentation," Intelligent Processing Systems, vol. 2, pp. 1773-1776 (1997).

(Continued)

*Primary Examiner*—Daniel Abebe
(74) *Attorney, Agent, or Firm*—Theodore M. Magee; Westman, Champlin & Kelly, P.A.

(57) ABSTRACT

A speech synthesizer is provided that concatenates stored samples of speech units without modifying the prosody of the samples. The present invention is able to achieve a high level of naturalness in synthesized speech with a carefully designed training speech corpus by storing samples based on the prosodic and phonetic context in which they occur. In particular, some embodiments of the present invention limit the training text to those sentences that will produce the most frequent sets of prosodic contexts for each speech unit. Further embodiments of the present invention also provide a multi-tier selection mechanism for selecting a set of samples that will produce the most natural sounding speech.

4 Claims, 6 Drawing Sheets

OTHER PUBLICATIONS

Wong, P. and Chan, C., "Chinese Word Segmentation Based on Maximum Matching and Word Binding Force," Coling'96, Copenhagen (1996).
Hon, H., Acero, A., Huang, S., Liu, J. and Plumpe, M., "Automated Generation of Synthesis Units for Trainable Text-to-Speech Systems," ICASSP'98, vol. 1, pp. 293-296 (1998).
Black, A. and Campbell, N., "Unit Selection in a Concatentaive Speech Synthesis System Using a Large Speech Database," ICASSP'96, pp. 373-376 (1996).
Chu, M., Tang, D., Si, H., Tian, Z. and Lu, S., "Research on Perception of Juncture Between Syllables in Chinese," Chinese Journal of Acoustics, vol. 17, No. 2, pp. 143-152.
Huang X et al., "Recent Improvements on Microsoft's Trainable Text-To-Speech System-Whistler," Acoustics, Speech and Signal Processing, 1997, pp. 959-962.
Hunt A et al., "Unit Selection in a Concatenative Speech Synthesis System Using a Large Speech Database," IEEE International Conference on Acoustics, Speech and Signal Processing, 1996, pp. 373-376.
Tien Ying Fung et al., "Concatenating Syllables for Response Generation in Spoken Language Applications," IEEE International Conference on Acoustics, Speech and Signal Processing, 2000, pp. 933-936.
Fu-Chiang Chou et al., "A Chinese Text-To-Speech System Based on Part-of-Speech Analysis, Prosodic Modeling and Non-Uniform Units," Acoustics, Speech, and Signal Processing, 1997, pp. 923-926.
Bigorgne D. et al., "Multilingual PSOLA Text-To-Speech System," Statistical Signal and Array Processing, Proceedings of the International Conference on Acoustics, Speech, and Signal Processing, 1993, pp. 187-190.
Nakajima S et al., "Automatic Generation of Synthesis Units Based on Context Oriented Clustering," International Conference on Acoustics, Speech and Signal Processing, 1988, pp. 659-662.
Black A W et al. "Optimizing Selection of Units from Speech Databases for Concatenative Synthesis," 4th European Conference on Speech Communication and Technology Eurospeech, 1995, pp. 581-584.
Copy of European Search Report Application No. EP 01 12 8765.
P.B. Mareuil and B. Soulage, "Input/output normalization and linguistic analysis for a multilingual text-to-speech Synthesis System," Proc. of 4th ISCA workshop on speech synthesis, Scotland, 2001.
http://www.microsoft.com/speech/techinfo/compliance/.
http://www.research.att.com/projects/tts/.
D.H. Klatt, "The Klattalk text-to-speech conversion system," Proc. of ICASSP '82, pp. 1589-1592, 1982.
H. Fujisaki, K. Hirose, N. Takahashi and H. Morikawa, "Acoustic characteristics and the underlying rules of intonation of the common Japanese used by radio and TV announcers," *Proc. of ICASSP '86*, pp. 2039-2042, 1986.
K.N. Ross and M. Ostendorf, "A dynamical system model for generating fundamental frequency for speech synthesis," IEEE transactions on speech and audio processing, vol. 7, No. 3, pp. 295-309, 1999.
J.R. Bellegarda, K. Silverman, K. Lenzo, and V. Anderson, "Statistical prosodic modeling: from corpus design to parameter estimation," IEEE transactions on speech and audio processing, vol. 9, No. 1, pp. 52-66, 2001.
S. Chen, S. Hwang and Y. Wang, "An RNN-based prosodic information synthesizer for Mandarin text-to-speech," IEEE transactions on speech and audio processing, vol. 6, No. 3, pp. 226-239, 1998.
M. Chu, H. Peng, H. Yang and E. Chang, "Selecting non-uniform units from a very large corpus for concatenative speech synthesizer," *Proc. of ICASSP '2001*, Salt Lake City, 2001.
E. Moulines and F. Charpentier, "Pitch-Synchronous Waveform Processing Techniques for Text-to-Speech Synthesis Using Diphones," Speech Communication vol. 9, pp. 453-467, 1990.
Y. Stylianou, T. Dutoit, and J. Schroeter, "Diphone concatenation using a harmonic plus noise model of speech," Proc. Of Eurospeech '97, pp. 613-616, Rhodes, 1997.
M. Chu, H. Peng, H. Yang and E. Chang, "Selecting non-uniform units from a very large corpus for concatenative speech synthesizer," Proc. of ICASSP '2001, Salt Lake City, 2001.
X.D. Huang, A. Acero, J. Adcock, et al., "Whistler: a trainable text-to-speech system," Proc. of 'ICSLP '96, Philadelphia, 1996.
R.E. Donovan and E.M. Eide, "The IBM trainable speech synthesis system," Proc. of ICSLP '98, Sidney, 1998.
H. Peng, Y. Zhao and M. Chu, "Perpetually optimizing the cost function for unit selection in a TTS system with one single run of MOS evaluation," Proc. of ICSLP '2002, Denver, 2002.
M. Chu and H. Peng, "An Objective measure for estimating MOS of synthesized speech," Proc. of Eurospeech '2001, Aalborg, 2001.
Office Action dated: Nov. 15, 2004 and Response dated: Dec. 8, 2004, from U.S. Appl. No. 09/850,527, filed May 7, 2001.

* cited by examiner

METHOD AND APPARATUS FOR SPEECH SYNTHESIS WITHOUT PROSODY MODIFICATION

REFERENCE TO RELATED APPLICATION

The present application is a divisional of and claims priority from U.S. patent application Ser. No. 09/850,527, filed May 7, 2001, now U.S. Pat. No. 6,978,239 which claims priority from a U.S. Provisional Application having Ser. No. 60/251,167, filed on Dec. 4, 2000 and entitled "PROSODIC WORD SEGMENTATION AND MULTI-TIER NON-UNIFORM UNIT SELECTION."

BACKGROUND OF THE INVENTION

The present invention relates to speech synthesis. In particular, the present invention relates to prosody in speech synthesis.

Text-to-speech technology allows computerized systems to communicate with users through synthesized speech. The quality of these systems is typically measured by how natural or human-like the synthesized speech sounds.

Very natural sounding speech can be produced by simply replaying a recording of an entire sentence or paragraph of speech. However, the complexities of human languages and the limitations of computer storage make it impossible to store every conceivable sentence that may occur in a text. Because of this, the art has adopted a concatenative approach to speech synthesis that can be used to generate speech from any text. This concatenative approach combines stored speech samples representing small speech units such as phonemes, diphones, triphones, or syllables to form a larger speech signal.

One problem with such concatenative systems is that a stored speech sample has a pitch and duration that is set by the context in which the sample was spoken. For example, in the sentence "Joe went to the store" the speech units associated with the word "store" have a lower pitch than in the question "Joe went to the store?" Because of this, if stored samples are simply retrieved without reference to their pitch or duration, some of the samples will have the wrong pitch and/or duration for the sentence resulting in unnatural sounding speech.

One technique for overcoming this is to identify the proper pitch and duration for each sample. Based on this prosody information, a particular sample may be selected and/or modified to match the target pitch and duration.

Identifying the proper pitch and duration is known as prosody prediction. Typically, it involves generating a model that describes the most likely pitch and duration for each speech unit given some text. The result of this prediction is a set of numerical targets for the pitch and duration of each speech segment.

These targets can then be used to select and/or modify a stored speech segment. For example, the targets can be used to first select the speech segment that has the closest pitch and duration to the target pitch and duration. This segment can then be used directly or can be further modified to better match the target values.

For example, one prior art technique for modifying the prosody of speech segments is the so-called Time-Domain Pitch-Synchronous Overlap-and-Add (TD-PSOLA) technique, which is described in "Pitch-Synchronous Waveform Processing Techniques for Text-to-Speech Synthesis using Diphones", E. Moulines and F. Charpentier, Speech Communication, vol. 9, no. 5, pp. 453–467, 1990. Using this technique, the prior art increases the pitch of a speech segment by identifying a section of the speech segment responsible for the pitch. This section is a complex waveform that is a sum of sinusoids at multiples of a fundamental frequency $F_0$. The pitch period is defined by the distance between two pitch peaks in the waveform.

To increase the pitch, the prior art copies a segment of the complex waveform that is as long as the pitch period. This copied segment is then shifted by some portion of the pitch period and reinserted into the waveform. For example, to double the pitch, the copied segment would be shifted by one-half the pitch period, thereby inserting a new peak half-way between two existing peaks and cutting the pitch period in half.

To lengthen a speech segment, the prior art copies a section of the speech segment and inserts the copy into the complex waveform. In other words, the entire portion of the speech segment after the copied segment is time-shifted by the length of the copied section so that the duration of the speech unit increases.

Unfortunately, these techniques for modifying the prosody of a speech unit have not produced completely satisfactory results. In particular, these modification techniques tend to produce mechanical or "buzzy" sounding speech.

Thus, it would be desirable to be able to select a stored unit that provides good prosody without modification. However, because of memory limitations, samples cannot be stored for all of the possible prosodic contexts in which a speech unit may be used. Instead, a limited set of samples must be selected for storage. Because of this, the performance of a system that uses stored samples without prosody modification is dependent on what samples are stored.

Thus, there is an ongoing need for improving the selection of these stored samples in systems that do not modify the prosody of the stored samples. There is also an ongoing need to reduce the computational complexity associated with identifying the proper prosody for the speech units.

SUMMARY OF THE INVENTION

A speech synthesizer is provided that concatenates stored samples of speech units without modifying the prosody of the samples. The present invention is able to achieve a high level of naturalness in synthesized speech with a carefully designed speech corpus by storing samples based on the prosodic and phonetic context in which they occur. In particular, some embodiments of the present invention limit the training text to those sentences that will produce the most frequent sets of prosodic contexts for each speech unit. Further embodiments of the present invention also provide a multi-tier selection mechanism for selecting a set of samples that will produce the most natural sounding speech.

Under those embodiments that limit the training text, only a limited set of the sentences in a very large corpus are selected and read by a human into a training speech corpus from which samples of units are selected to produce natural sounding speech. To identify which sentences are to be read, embodiments of the present invention determine a frequency of occurrence for each context vector associated with a speech unit. Context vectors with a frequency of occurrence that is larger than a certain threshold are identified as necessary context vectors. Sentences that include the most necessary context vectors are selected for recording until all of the necessary context vectors have been included in the selected sub-set of sentences.

In embodiments that use a multi-tier selection method, a set of candidate speech segments is identified for each speech unit by comparing the input context vector to the context vectors associated with the speech segments. A path through the candidate speech segments is then selected based on differences between the input context vectors and the stored context vectors as well as some smoothness cost that indicates the prosodic smoothness of the resulting concatenated speech signal. Under one embodiment, the smoothness cost gives preference to selecting a series of speech segments that appeared next to each other in the training corpus.

DETAILED DESCRIPTION OF ILLUSTRATIVE EMBODIMENTS

Figure 1:
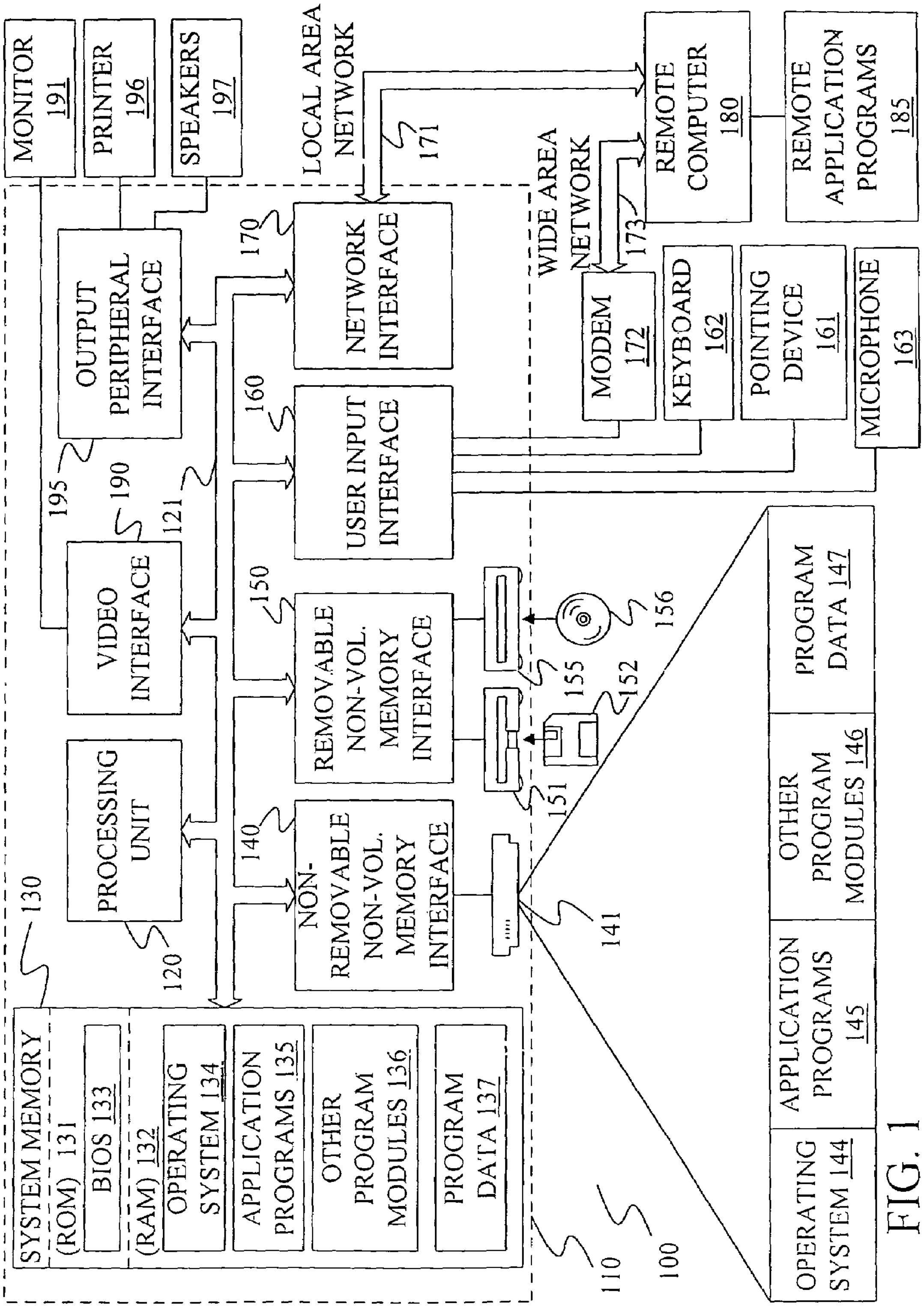
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
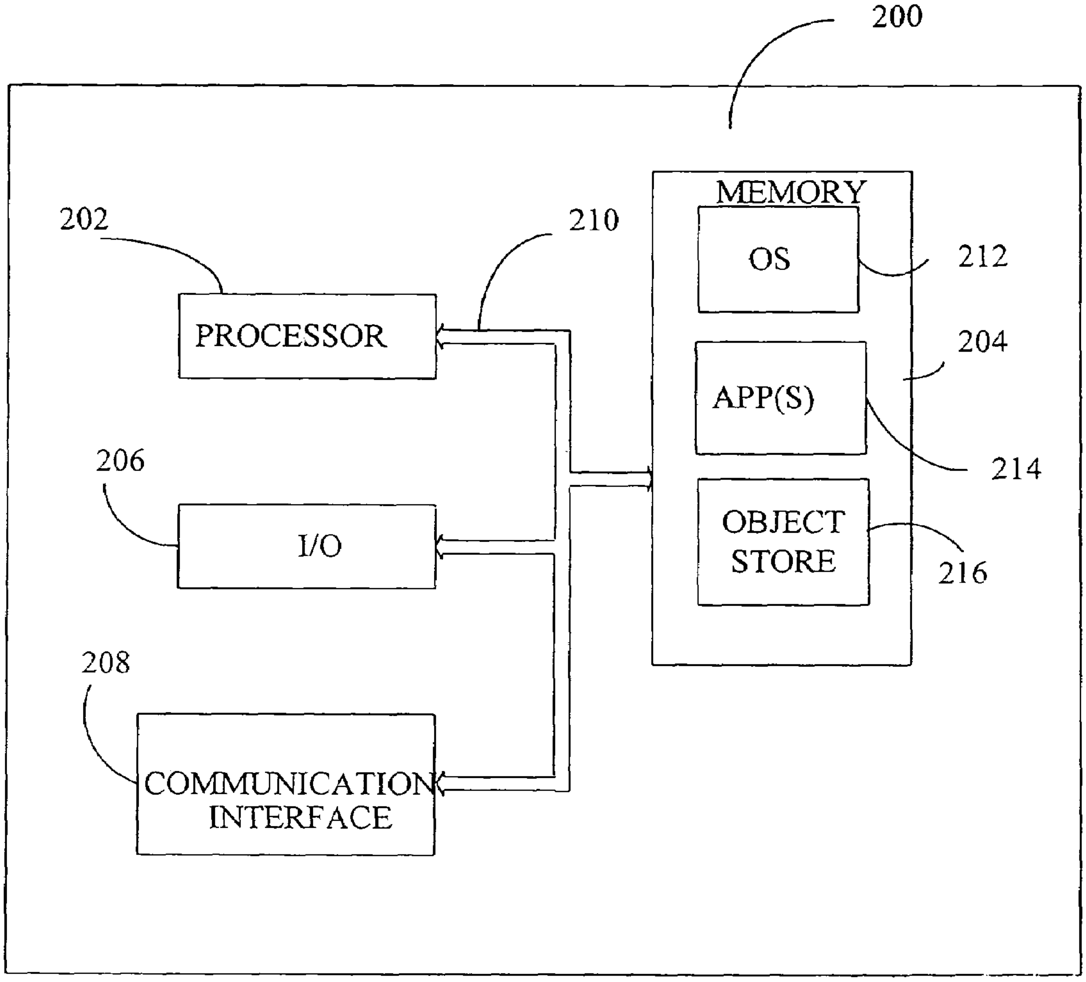
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under the present invention, a speech synthesizer is provided that concatenates stored samples of speech units without modifying the prosody of the samples. The present invention is able to achieve a high level of naturalness in synthesized speech with a carefully designed speech corpus by storing samples based on the prosodic and phonetic context in which they occur. In particular, the present invention limits the training text to those sentences that will produce the most frequent sets of prosodic contexts for each speech unit. The present invention also provides a multi-tier selection mechanism for selecting a set of samples that will produce the most natural sounding speech.

Figure 3:
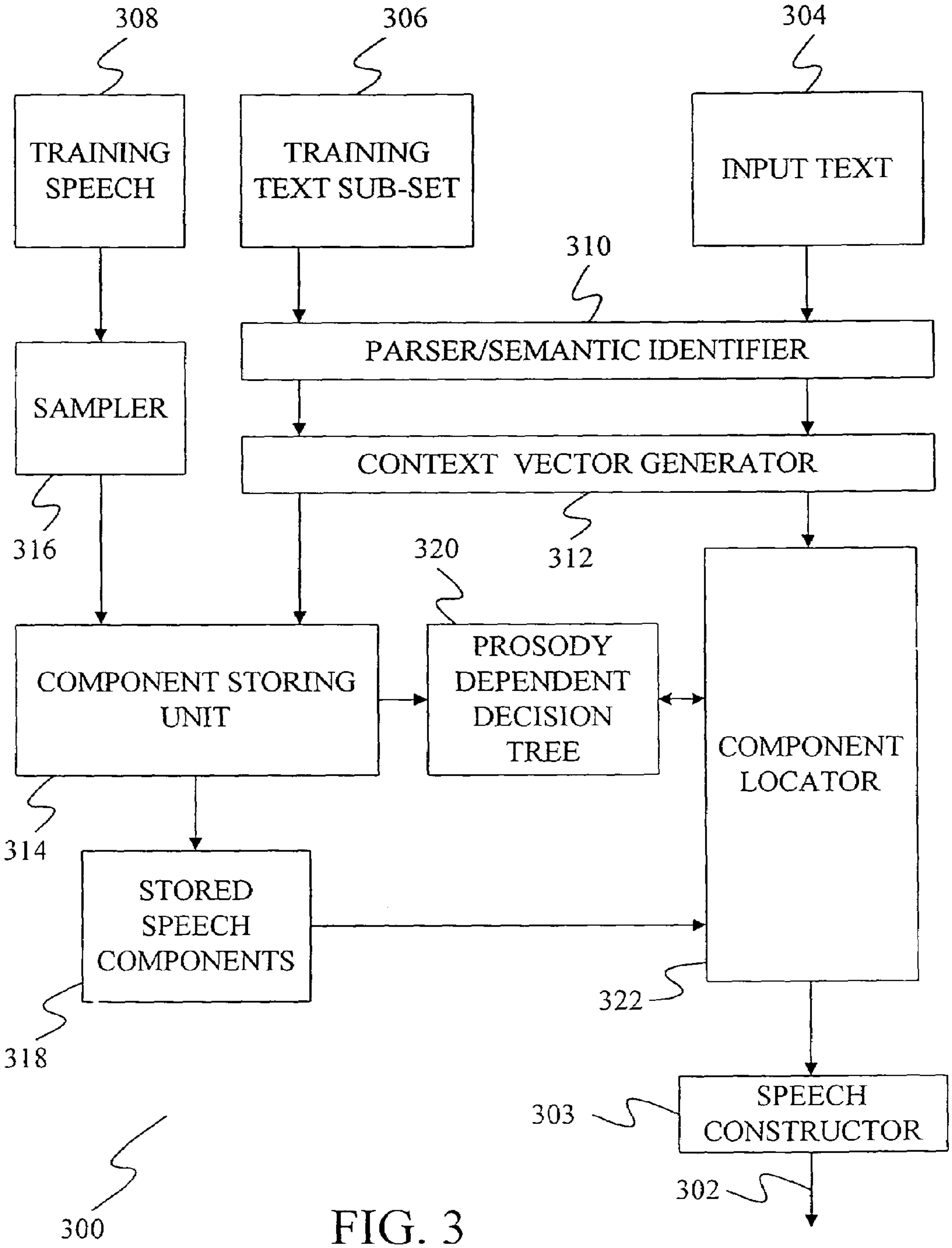
FIG. 3 is a block diagram of a speech synthesis system.

FIG. 3 is a block diagram of a speech synthesizer 300 that is capable of constructing synthesized speech 302 from an input text 304 under embodiments of the present invention.

Before speech synthesizer 300 can be utilized to construct speech 302, it must be initialized with samples of speech units taken from a training text 306 that is read into speech synthesizer 300 as training speech 308.

As noted above, speech synthesizers are constrained by a limited size memory. Because of this, training text 306 must be limited in size to fit within the memory. However, if the training text is too small, there will not be enough samples of the training speech to allow for concatenative synthesis without prosody modifications. One aspect of the present invention overcomes this problem by trying to identify a set of speech units in a very large text corpus that must be included in the training text to allow for concatenative synthesis without prosody modifications.

Figure 4:
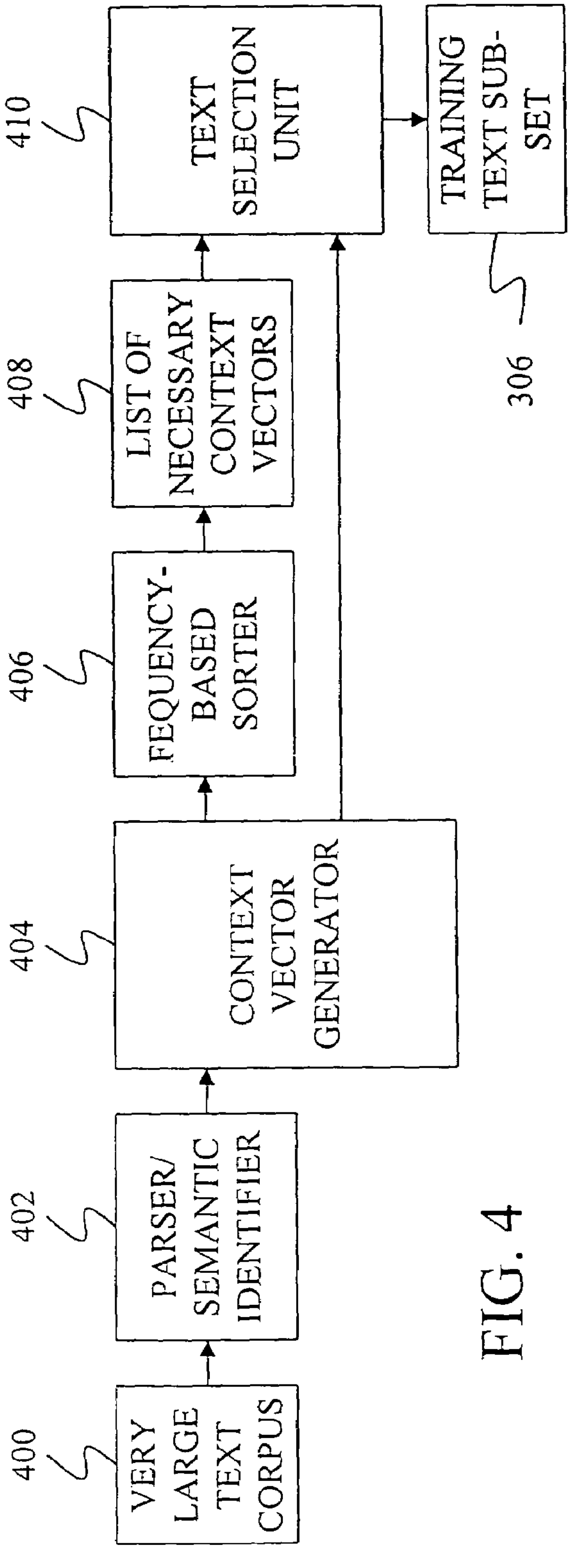
FIG. 4 is a block diagram of a system for selecting a training text subset from a very large training corpus.

FIG. 4 provides a block diagram of components used to identify smaller training text 306 of FIG. 3 from a very large corpus 400. Under one embodiment, very large corpus 400 is a corpus of five years worth of the People's Daily, a Chinese newspaper, and contains about 97 million Chinese Characters.

Initially, large corpus 400 is parsed by a parser/semantic identifier 402 into strings of individual speech units. Under most embodiments of the invention, especially those used to form Chinese speech, the speech units are tonal syllables. However, other speech units such as phonemes, diphones, or triphones may be used within the scope of the present invention.

Parser/semantic identifier 402 also identifies high-level prosodic information about each sentence provided to the parser. This high-level prosodic information includes the predicted tonal levels for each speech unit as well as the grouping of speech units into prosodic words and phrases. In embodiments where tonal syllable speech units are used, parser/semantic identifier 402 also identifies the first and last phoneme in each speech unit.

The strings of speech units produced from the training text are provided to a context vector generator 404, which generates a Speech unit-Dependent Descriptive Contextual Variation Vector (SDDCVV, hereinafter referred to as a context vector). The context vector describes several context variables that can affect the prosody of the speech unit. Under one embodiment, the context vector describes six variables or coordinates. They are:

Position in phrase: the position of the current speech unit in its carrying prosodic phrase.

Position in word: the position of the current speech unit in its carrying prosodic word.

Left phonetic context: category of the last phoneme in the speech unit to the left of the current speech unit.

Right phonetic context: category of the first phoneme in the speech unit to the right of the current speech unit.

Left tone context: the tone category of the speech unit to the left of the current speech unit.

Right tone context: the tone category of the speech unit to the right of the current speech unit.

Under one embodiment, the position-in-phrase coordinate and the position-in-word coordinate can each have one of four values, the left phonetic context can have one of eleven values, the right phonetic context can have one of twenty-six values and the left and right tonal contexts can each have one of two values. Under this embodiment, there are 4*4*11*26*2*2=18304 possible context vectors for each speech unit.

The context vectors produced by generator 404 are grouped based on their speech unit. For each speech unit, a frequency-based sorter 406 identifies the most frequent context vectors for each speech unit. The most frequently occurring context vectors for each speech unit are then stored in a list of necessary context vectors 408. In one embodiment, the top context vectors, whose accumulated frequency of occurrence is not less than half of the total frequency of occurrence of all units, are stored in the list.

The sorting and pruning performed by sorter 406 is based on a discovery made by the present inventors. In particular, the present inventors have found that certain context vectors occur repeatedly in the corpus. By making sure that these context vectors are found in the training corpus, the present invention increases the chances of having an exact context match for an input text without greatly increasing the size of the training corpus. For example, the present inventors have found that by ensuring that the top two percent of the context vectors are represented in the training corpus, an exact context match will be found for an input text speech unit over fifty percent of the time.

Using the list of necessary context vectors 408, a text selection unit 410 selects sentences from very large corpus 400 to produce training text subset 306. In a particular embodiment, text selection unit 410 uses a greedy algorithm to select sentences from corpus 400. Under this greedy algorithm, selection unit 410 scans all sentences in the corpus and picks out one at a time to add to the selected group.

During the scan, selection unit 410 determines how many context vectors in list 408 are found in each sentence. The sentence that contains the maximum number of needed context vectors is then added to training text 306. The context vectors that the sentence contains are removed from list 408 and the sentence is removed from the large text corpus 400. The scanning is repeated until all of the context vectors have been removed from list 408.

After training text subset 306 has been formed, it is read by a person and digitized into a training speech corpus. Both the training text and training speech can be used to initialize speech synthesizer 300 of FIG. 3. This initialization begins by parsing the sentences of text 306 into individual speech units that are annotated with high-level prosodic information. In FIG. 3, this is accomplished by a parser/semantic identifier 310, which is similar to parser/semantic identifier 402 of FIG. 4. The parsed speech units and their high-level prosodic description are then provided to a context vector generator 312, which is similar to context vector generator 404 of FIG. 4.

The context vectors produced by context vector generator 312 are provided to a component storing unit 314 along with speech samples produced by a sampler 316 from training speech signal 308. Each sample provided by sampler 316 corresponds to a speech unit identified by parser 310. Component storing unit 314 indexes each speech sample by its context vector to form an indexed set of stored speech components 318.

Under one embodiment, the samples are indexed by a prosody-dependent decision tree (PDDT), which is formed automatically using a classification and regression tree (CART). CART provides a mechanism for selecting questions that can be used to divide the stored speech components into small groups of similar speech samples. Typically, each question is used to divide a group of speech components into two smaller groups. With each question, the components in the smaller groups become more homogenous. The process for using CART to form the decision tree is shown in FIG. 5.

Figure 5:
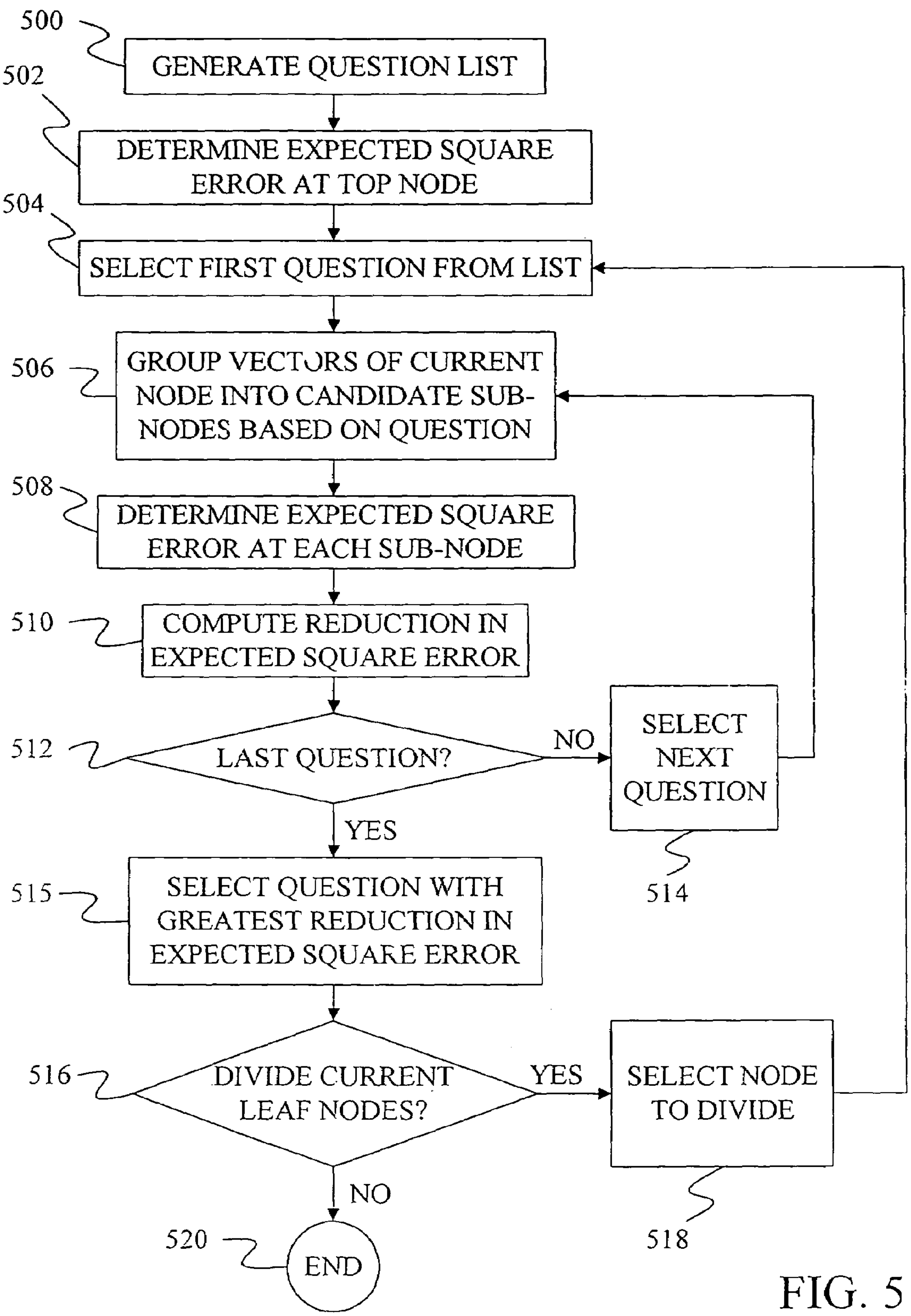
FIG. 5 is a flow diagram for constructing a decision tree under one embodiment of the present invention.

At step 500 of FIG. 5, a list of candidate questions is generated for the decision tree. Under one embodiment, each question is directed toward some coordinate or combination of coordinates in the context vector.

At step 502, an expected square error is determined for all of the training samples from sampler 316. The expected square error gives a measure of the distances among a set of features of each sample in a group. In one particular embodiment, the features are prosodic features of average fundamental frequency ($F_a$), average duration ($F_b$), and range of the fundamental frequency ($F_c$) for a unit. For this embodiment, the expected square error is defined as:

$$ESE(t)=E(W_aE_a+W_bE_b+W_cE_c) \qquad \text{EQ. 1}$$

where ESE(t) is the expected square error for all samples X on node t in the decision tree, $E_a$, $E_b$, and $E_c$ are the square error for $F_a$, $F_b$, and $F_c$, respectively, $W_a$, $W_b$, and $W_c$ are weights, and the operation of determining the expected value of the sum of square errors is indicated by the outer E( ).

Each square error is then determined as:

$$E_j=|F_j-R(F_j)|^2,\ j=a,b,c \qquad \text{EQ. 2}$$

where $R(F_j)$ is a regression value calculated from samples X on node t. In this embodiment, the regression value is the expected value of the feature as calculated from the samples X at node t: $R_j(F_j)=E(F_j/X\in node_t)$.

Once the expected square error has been determined at step 502, the first question in the question list is selected at step 504. The selected question is applied to the context vectors at step 506 to group the samples into candidate sub-nodes for the tree. The expected square error of each sub-node is then determined at step 508 using equations 1 and 2 above.

At step 510, a reduction in expected square error created by generating the two sub-nodes is determined. Under one embodiment, this reduction is calculated as:

$$\Delta WESE(t)=ESE(t)P(t)-(ESE(l)P(l)+ESE(r)P(r)) \qquad \text{EQ. 3}$$

where ΔWESE(t) is the reduction in expected square error, ESE(t) is the expected square error of node t, against which the question was applied, P(t) is the percentage of samples in node t, ESE(l) and ESE(r) are the expected square error of the left and right sub-nodes formed by the question, respectively, and P(l) and P(r) are the percentage of samples in the left and right node, respectively.

The reduction in expected square error provided by the current question is stored and the CART process determines if the current question is the last question in the list at step 512. If there are more questions in the list, the next question is selected at step 514 and the process returns to step 506 to divide the current node into sub-nodes based on the new question.

After every question has been applied to the current node at step 512, the reductions in expected square error provided by each question are compared and the question that provides the greatest reduction is set as the question for the current node of the decision tree at step 515.

At step 516, a decision is made as to whether or not the current set of leaf nodes should be further divided. This determination can be made based on the number of samples in each leaf node or the size of the reduction in square error possible with further division.

Under one embodiment, when the decision tree is in its final form, each leaf node will contain a number of samples for a speech unit. These samples have slightly different prosody from each other. For example, they may have different phonetic contexts or different tonal contexts from each other. By maintaining these minor differences within a leaf node, this embodiment of the invention introduces slender diversity in prosody, which is helpful in removing monotonous prosody.

If the current leaf nodes are to be further divided at step 516, a leaf node is selected at step 518 and the process returns to step 504 to find a question to associate with the selected node. If the decision tree is complete at step 516, the process of FIG. 5 ends at step 520.

The process of FIG. 5 results in a prosody-dependent decision tree 320 of FIG. 3 and a set of stored speech samples 318, indexed by decision tree 320. Once created, decision tree 320 and speech samples 318 can be used under further aspects of the present invention to generate concatenative speech without requiring prosody modification.

The process for forming concatenative speech begins by parsing a sentence in input text 304 using parser/semantic identifier 310 and identifying high-level prosodic information for each speech unit produced by the parse. This prosodic information is then provided to context vector generator 312, which generates a context vector for each speech unit identified in the parse. The parsing and the production of the context vectors are performed in the same manner as was done during the training of prosody decision tree 320.

The context vectors are provided to a component locator 322, which uses the vectors to identify a set of samples for the sentence. Under one embodiment, component locator 322 uses a multi-tier non-uniform unit selection algorithm to identify the samples from the context vectors.

Figure 6:
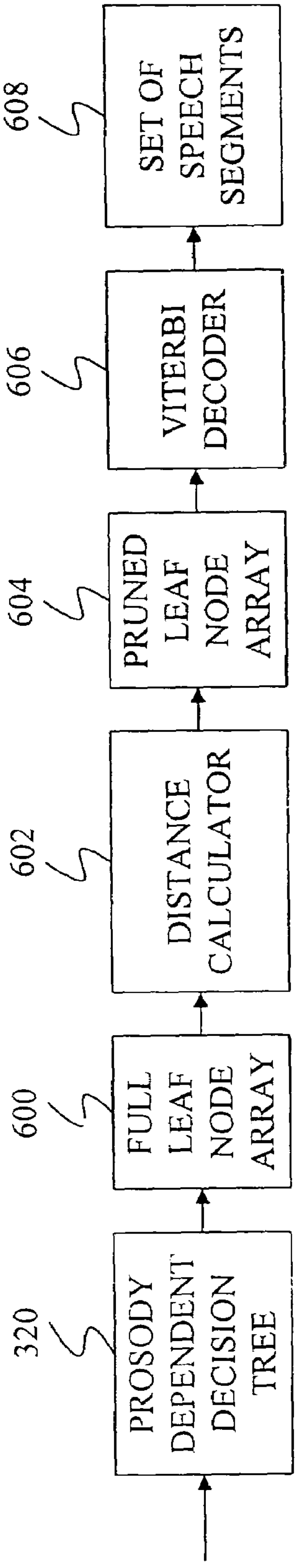
FIG. 6 is a block diagram of a multi-tier selection system for selecting speech segments under embodiments of the present invention.
Figure 7:
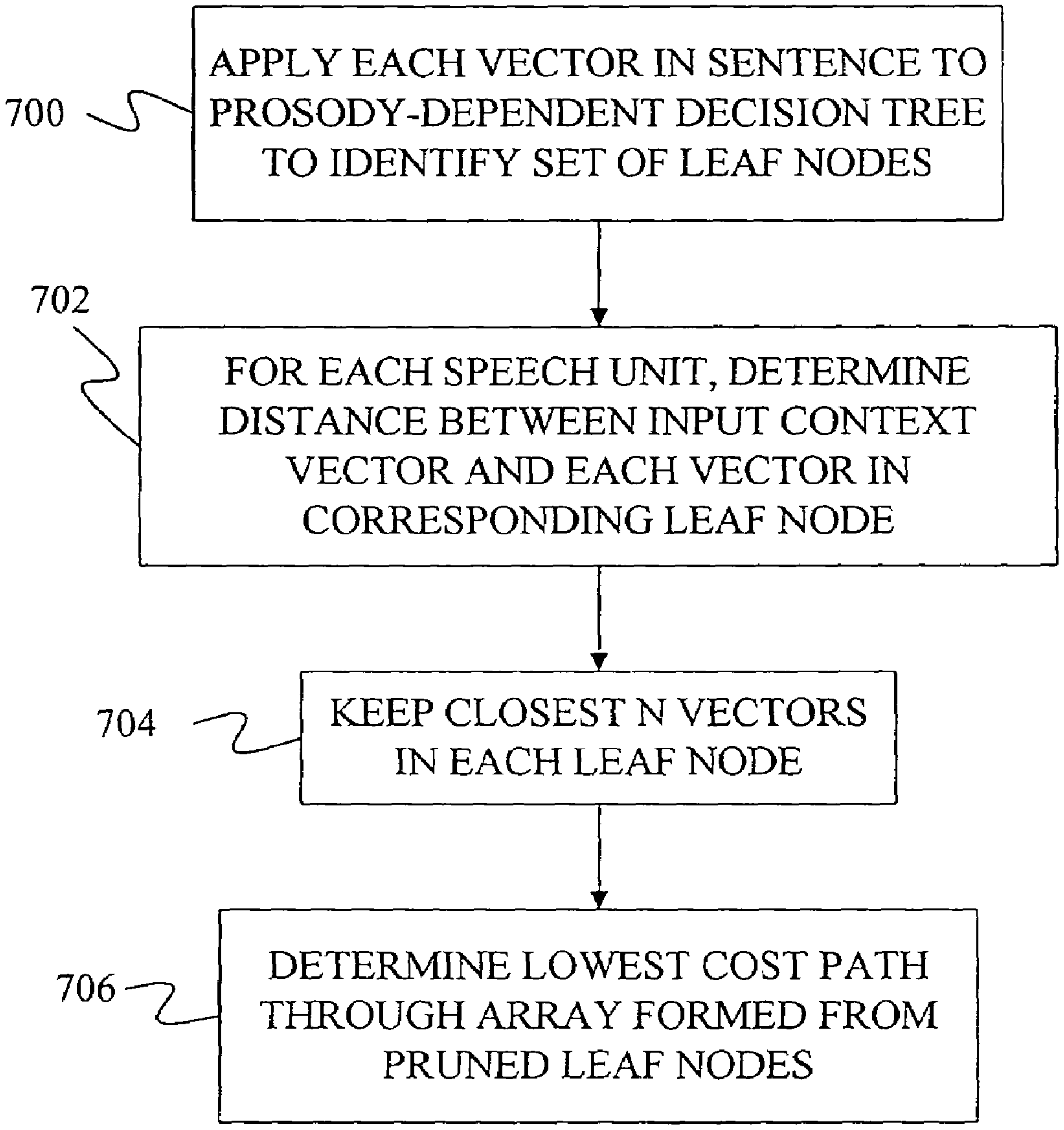
FIG. 7 is a flow diagram of a multi-tier selection system for selecting speech segments under embodiments of the present invention.

FIGS. 6 and 7 provide a block diagram and a flow diagram for the multi-tier non-uniform selection algorithm. In step 700, each vector in the set of input context vectors is applied to prosody-dependent decision tree 320 to identify a leaf node array 600 that contains a leaf node for each context vector. At step 702, a set of distances is determined by a distance calculator 602 for each input context vector. In particular, a separate distance is calculated between the input context vector and each context vector found in its respective leaf node. Under one embodiment, each distance is calculated as:

$$D_c=\sum_{i=1}^{I} W_{ci}D_i \qquad \text{EQ. 4}$$

where $D_c$ is the context distance, $D_i$ is the distance for coordinate i of the context vector, $W_{ci}$ is a weight associated with coordinate i, and I is the number of coordinates in each context vector.

At step 704, the N samples with the closest context vectors are retained while the remaining samples are pruned from node array 600 to form pruned leaf node array 604. The number of samples, N, to leave in the pruned nodes is determined by balancing improvements in prosody with improved processing time. In general, more samples left in the pruned nodes means better prosody at the cost of longer processing time.

At step 706, the pruned array is provided to a Viterbi decoder 606, which identifies a lowest cost path through the pruned array. Under a single-tier embodiment of the present invention, the lowest cost path is identified simply by selecting the sample with the closest context vector in each node. Under a multi-tier embodiment, the cost function is modified to be:

$$C_c = W_c \sum_{j=1}^{J} D_{cj} + W_s \sum_{j=1}^{J} C_{sj} \quad \text{EQ. 5}$$

where $C_c$ is the concatenation cost for the entire sentence, $W_c$ is a weight associated with the distance measure of the concatenated cost, $D_{cj}$ is the distance calculated in equation 4 for the $j^{th}$ speech unit in the sentence, $W_s$ is a weight associated with a smoothness measure of the concatenated cost, $C_{sj}$ is a smoothness cost for the $j^{th}$ speech unit, and J is the number of speech units in the sentence.

The smoothness cost in Equation 5 is defined to provide a measure of the prosodic mismatch between sample j and the samples proposed as the neighbors to sample j by the Viterbi decoder. Under one embodiment, the smoothness cost is determined based on whether a sample and its neighbors were found as neighbors in an utterance in the training corpus. If a sample occurred next to its neighbors in the training corpus, the smoothness cost is zero since the samples contain the proper prosody to be combined together. If a sample did not occur next to its neighbors in the training corpus, the smoothness cost is set to one.

Using the multi-tier non-uniform approach, if a large block of speech units, such as a word or a phrase, in the input text exists in the training corpus, preference will be given to selecting all of the samples associated with that block of speech units. Note, however, that if the block of speech units occurred within a different prosodic context, the distance between the context vectors will likely cause different samples to be selected than those associated with the block.

Once the lowest cost path has been identified by Viterbi decoder 606, the identified samples 608 are provided to speech constructor 303. With the exception of small amounts of smoothing at the boundaries between the speech units, speech constructor 303 simply concatenates the speech units to form synthesized speech 302. Thus, the speech units are combined without having to change their prosody.

Although the present invention has been described with reference to particular embodiments, workers skilled in the art will recognize that changes may be made in form and detail without departing from the spirit and scope of the invention. In particular, although context vectors are discussed above, other representations of the context information sets may be used within the scope of the present invention.

What is claimed is:

1. A method of selecting speech segments for concatenative speech synthesis, the method comprising:

parsing an input text into speech units;

identifying context information for each speech unit based on its location in the input text and at least one neighboring speech unit;

identifying a set of candidate speech segments for each speech unit based on the context information through steps comprising applying the context information for a speech unit to a decision tree to identify a leaf node containing candidate speech segments for the speech unit; and identifying a sequence of speech segments from the candidate speech segments based in part on a smoothness cost between the speech segments.

2. The method of claim 1 wherein identifying a set of candidate speech segments further comprises pruning some speech segments from a leaf node based on differences between the context information of the speech unit from the input text and context information associated with the speech segments.

3. The method of claim 1 wherein identifying a sequence of speech segments comprises using a smoothness cost that is based on whether two neighboring candidate speech segments appeared next to each other in a training corpus.

4. The method of claim 1 wherein identifying a sequence of speech segments further comprises identifying the sequence based in part on differences between context information for the speech unit of the input text and context information associated with a candidate speech segment.

* * * * *